(12) United States Patent
Woolven et al.

(10) Patent No.: US 11,928,102 B2
(45) Date of Patent: *Mar. 12, 2024

(54) COMPUTING NETWORKS AND SYSTEMS FOR UPDATING DATA

(71) Applicant: Veeva Systems Inc., Pleasanton, CA (US)

(72) Inventors: Eric Woolven, Toronto (CA); Serena Kim, Toronto (CA); Marius K. Mortensen, Burlington (CA); Asaf Roll, Richmond Hill (CA); Zhen Tan, North York (CA)

(73) Assignee: Veeva Systems Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,218

(22) Filed: Feb. 13, 2023

(65) Prior Publication Data

US 2023/0195717 A1 Jun. 22, 2023

Related U.S. Application Data

(63) Continuation of application No. 17/364,239, filed on Jun. 30, 2021, now Pat. No. 11,580,095.

(51) Int. Cl.
*G06F 16/00* (2019.01)
*G06F 9/451* (2018.01)
*G06F 16/23* (2019.01)
*G06F 21/84* (2013.01)

(52) U.S. Cl.
CPC .......... *G06F 16/2365* (2019.01); *G06F 9/451* (2018.02); *G06F 21/84* (2013.01)

(58) Field of Classification Search
None
See application file for complete search history.

(56) References Cited

U.S. PATENT DOCUMENTS

| 2007/0299697 | A1* | 12/2007 | Friedlander | G16H 10/60 705/3 |
| 2014/0244300 | A1* | 8/2014 | Bess | G06F 16/22 705/3 |
| 2017/0262586 | A1* | 9/2017 | Bess | G16Z 99/00 |
| 2021/0312065 | A1* | 10/2021 | Yang | G06F 21/44 |

* cited by examiner

*Primary Examiner* — Anhtai V Tran
(74) *Attorney, Agent, or Firm* — Baker & McKenzie LLP

(57) ABSTRACT

Systems and methods are provided for updating data in a computer network. An exemplary method includes: receiving a first data from one or more data servers; determining a second data for which a first update information is used to update at least one element of the second data; generating a second update information associated with the second data; generating a third update information by executing an operation that compares the first update information and the second update information; generating a third data by applying the third update information to the second data; allowing a user to select via a display device which of the different update elements to update the second data; generating a fourth update information by determining the selected different update elements to update the second data; and updating the second data using the fourth update information.

20 Claims, 10 Drawing Sheets

| | | | |
|---|---|---|---|
| ▼ Details — 602a | | | |
| | Report Type | Study | Study |
| | Receipt Date | RD1 | RD1 |
| | New Info Date | NID1 | ☑ NEW NID1 |
| | Event (PT) | Pain | Pain |
| | Seriousness | SER2 | ☐ SER1→SER2 |
| | Relatedness | Unknown | |
| ▼ Contacts — 602b | | | 606a / 606b |
| | ▼ C1 | | ☐ C2 |
| | *New (4), Modifications (2), Deletions (0)* [Ignore] 610 | | C2 - 00018 - 10Oct2020  [+ Create] 614 |
| | Qualification | Q1 | ☑ Q1 |
| | Title | T1 | ☑ T1 |
| | First Name | FN1 | ☐ FN2 |
| | Last Name | LN1 | ☐ LN1 |
| | Organization | RO Not Asked | ☑ O2 |
| | Department | D2 | ☐ D1→D2 |
| | Email | EM1 | ☑ NEW EM1 |
| ▼ Patient — 602c | | | 608a / 608b |
| | Patient First Name | PFN2 | ☑ PFN1→PFN2 |
| | Patient Last Name | T1 | ☑ PLN1 |
| | Investigation MRN | IMRN1 | ☑ NEW IMRN1 |
| | Date of Birth | DOB2 | ☐ DOB1→DOB2 |
| | Gender | ..... | ..... |
| | Height | | H1 |
| | Weight | | ☑ DELETE W1 |

600 / 604a / 604b / 612 (multiple)

FIG. 6

COMPUTING NETWORKS AND SYSTEMS FOR UPDATING DATA

CROSS-REFERENCE TO RELATED APPLICATIONS

This application claims priority to and is a continuation of U.S. patent application Ser. No. 17/364,239, filed on Jun. 30, 2021, now U.S. Pat. No. 11,580,095 issued on Feb. 14, 2023, the disclosure of which is incorporated by reference in its entirety for all purposes.

TECHNICAL FIELD

The present disclosure relates to methods and systems for accessing, sharing, and updating data using complex computing networks.

BACKGROUND

Researchers, scientists, industry players, academics, government regulators, and other stakeholders are increasingly in need of submitting data across a vast area of computer networks.

SUMMARY

According to one aspect of the subject matter described in this disclosure, a method for updating data in a computer network is provided. The method includes the following: receiving, using one or more computing device processors, a first data from one or more data servers; configuring, using the one or more computing device processors, the first data to be compatible for use in a data cloud server; retrieving, using the one or more computing device processors, from the configured first data, a first update information; determining, using the one or more computing device processors and the first update information, a second data requiring update information; in response to determining the second data, retrieving, using the one or more computing device processors, the second data from the data cloud server; generating, using the one or more computing device processors and the second data, a second update information associated with the second data; generating, using the one or more computing device processors, a third update information by executing an operation that compares the first update information with the second update information, wherein the third update information is associated with updating the second data; generating, using the one or more computing device processors, a third data by applying the third update information to the second data; determining, using the one or more computing device processors, whether the third data and the second data include protected data; initiating a first display, using the one or more computing device processors, of the third data except the protected data via a display device; initiating a second display, using the one or more computing device processors, of the third update information having different update elements of the third data, wherein different graphical representations are used to indicate the different update elements via the display device; comparing, using the one or more computing device processors, the first display and the second display to assess the different update elements of the third update information; allowing, using the one or more computing device processors, a user to select via the display device which of the different update elements to update the second data; generating, using the one or more computing device processors, a fourth update information by determining the selected different update elements to update the second data; and updating, using the one or more computing device processors, the second data using the fourth update information.

According to another aspect of the subject matter described in this disclosure, a system for updating data in a computer network is provided. The system includes one or more computing device processors. One or more computing device memories are coupled to the one or more computing device processors. The one or more computing device memories store instructions executed by the one or more computing device processors, the instructions are configured to: receive a first data from one or more data servers; configure the first data to be compatible for use in a data cloud server; retrieve from the configured first data, a first update information; determine, using the first update information, a second data requiring update information; in response to determining the second data, retrieve the second data from the data cloud server; generate, using the second data, a second update information associated with the second data; generate a third update information by executing an operation that compares the first update information with the second update information, wherein the third update information is associated with updating the second data; generate a third data by applying the third update information to the second data; determine whether the third data and the second data include protected data; initiate a first display of the third data except the protected data via a display device; initiate a second display of the third update information having different update elements of the third data, wherein different graphical representations are used to indicate the different update elements via the display device; compare the first display and the second display to assess the different update elements of the third update information; allow a user to select via the display device which of the different update elements to update the second data; generate a fourth update information by determining the selected different update elements to update the second data; and update the second data using the fourth update information.

According to another aspect of the subject matter described in this disclosure, a method for updating data in a computer network is provided. The method includes the following: receiving, using one or more computing device processors, a first data from one or more data servers; retrieving, using the one or more computing device processors, from the first data a first update information; determining, using the one or more computing device processors and the first update information, a second data for which the first update information is used to update at least one element of the second data; generating, using the one or more computing device processors and the second data, a second update information associated with the second data; generating, using the one or more computing device processors, a third update information by executing an operation that compares the first update information and the second update information, wherein the third update information is associated with updating the second data; generating, using the one or more computing device processors, a third data by applying the third update information to the second data; determining, using the one or more computing device processors, whether the third data and second data includes protected data; initiating a first display, using the one or more computing device processors, of the third data except the protected data via a display device; initiating a second display, using the one or more computing device processors, of the third update information having different update elements of the third data, wherein different graphical representations are used to indicate the different update elements via the display device; comparing, using the one or more computing device processors, the first display and the second display to assess the different update elements of the third update information; allowing, using the one or more computing device processors, a user to select via the display device which of the different update elements to update the second data; generating, using the one or more computing device processors, a fourth update information by determining the selected different update elements to update the second data; and updating, using the one or more computing device processors, the second data using the fourth update information.

BRIEF DESCRIPTION OF THE DRAWINGS

The disclosure is illustrated by way of example, and not by way of limitation in the figures of the accompanying drawings in which like reference numerals are used to refer to similar elements. The various elements shown in the figures that follow may be optional depending on a given embodiment without departing from the principles provided in this disclosure.

FIG. 6 shows an example interface illustrating updated information for the details field, the contacts field, and the patients field of a case, according to one embodiment.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

System Environment

Figure 1:
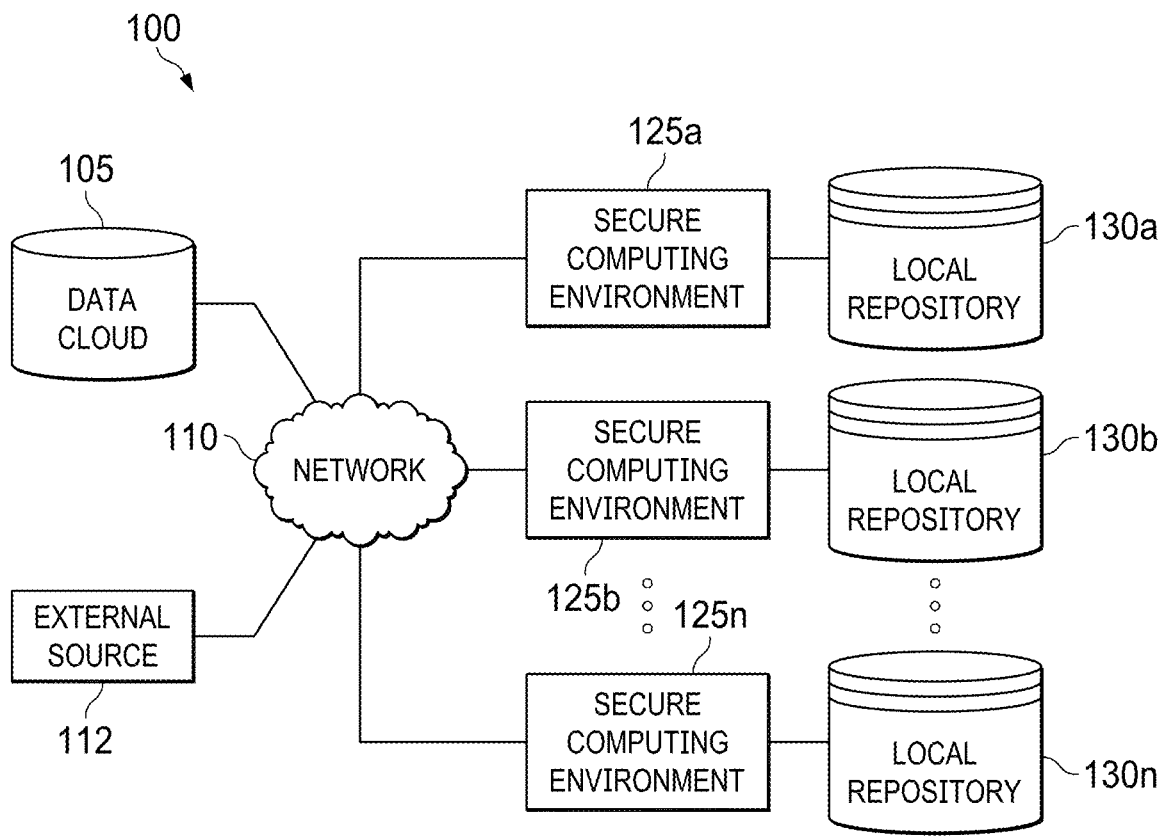
FIG. 1 is a high-level network system for accessing, managing, and sharing structured data, according to one embodiment.

Illustrated in FIG. 1 is a high level network system 100 for generating interfaces that access, maintain, analyze, and display structured data. In the depicted implementation, the system 100 may include a data cloud server 105 communicatively coupled to a plurality of secure computing environments 125 external sources 112 via the network 110. The secure computing environments 125 may in turn be communicatively coupled to a local repository 130. While a single data cloud server 105 is illustrated, the disclosed principles and techniques could be expanded to include multiple data cloud servers 105.

The data cloud server 105, according to some embodiments, is configured to store a plurality of structured data in a secure environment requiring authentication before access is granted to the structured data. According to one implementation, the structured data includes hierarchical data having varying and connected categories/levels that describe a plurality of aspects of the structured data. In some cases, the structured data in the data cloud server 105 is sourced or obtained from third-party scientific sources, and/or from third-party regulatory agencies, and/or from academic sources, and/or from industrial sources, etc.

In addition, the data cloud server 105 may be configured to manage or otherwise maintain the integrity and/or version updates of the structured data so that a user (e.g., a user of the secure computing environment) does not have to deal with such data maintenance processes as the structured data changes and/or grows. In one embodiment, the data cloud server 105 provides the most current version of the structured data to a user of the system. In other embodiments, the data cloud server 105 can also provide historical versions of the structured data when necessary or needed. Furthermore, the data cloud server 105 may include mechanisms that execute operations of data decompression operations, data decryption operations, and data decoding operations associated with the structured data so that the user is effectively isolated from such operations.

Moreover, the data cloud server 105 allows for easy associating, tagging, or coding of information for retrieval purposes. In some cases, the tagging or coding is automatically executed by the data cloud server 105. In addition, the data cloud server 105 allows a user (e.g., user of the secure computing environment 125) to transition from accessing structured data from the local repository 130 to the data cloud server 105.

The data cloud server 105 may be implemented within a computing device such as a mainframe server, a content server, a communication server, a laptop computer, a desktop computer, a handheld computing device, a virtual machine, a cloud-based computing solution and/or service, and/or the like. The data cloud server 105 may include a plurality of computing devices configured to communicate with one another and/or implement the techniques described herein. In some instances, the data cloud server 105 may include various elements of a computing environment as described with reference to FIGS. 2A and/or 2B. For example, the data cloud server 105 may include a processing system 202, a memory 204, an input/output (I/O) system 206, and a communication system 208. A user (e.g., a database administrator) may operate/maintain the data cloud server 105 either locally or remotely as the case may require.

The data cloud server 105 may be configured to have storage logic that is executable to store structured data that is shared across multiple secure computing environments 125. According to one implementation, the data cloud server 105 may include a plurality of non-volatile/non-transitory storage media such as solid state storage media, hard disk storage media, virtual storage media, cloud-based storage drives, storage servers, and/or the like. The plurality of storage media may be configured to store data from a plurality of sources. For example, the data cloud server 105 may include storage logic that is executable to store structured data derived from, for example, medical data, research data, education data, government data, etc. According to some implementations, the storage logic of the data cloud server 105 may be configured to automatically monitor and/or update relevant structured data obtained from a third-party source. For example, the storage logic of the data cloud server 105 may periodically monitor updates associated with structured data (e.g., dictionary of medical terms for research and regulatory purposes) from third-party organizations/sources and automatically update different versions of the structured data within one or more storage media of the data cloud server 105. In one embodiment, the storage logic of the data cloud server 105 manipulates or otherwise formats the structured data such that user interfaces generated by a secure computing environment 125 can seamlessly access/retrieve and present the structured data to a user. In addition, structured data from the data cloud server 105 may be accessed on a regulated basis via credential access, for example. This regulated basis may be determined, in part, by licenses, privileges, and other levels of authorization dictated by a user's credentials.

The external source 112 may operate similarly like the data cloud server 105 including having all the technical features of the data cloud server 105 described herein. The difference between the external source 112 and the data cloud server 105 is the external source 112 operates in providing information to the data cloud server 105 when requested. While a single external source 112 is illustrated, the disclosed principles and techniques could be expanded to include multiple external sources 112.

The local repository 130 may include storage logic for storing a local copy of structured data from the data cloud server 105. The local repository 130 may also be configured to store data other than the structured data. For example, the local repository 130 may store data from third-party sources and other data generated by the secure computing environment 125. The local repository may include a plurality of non-volatile/non-transitory storage media such as solid state storage media, hard disk storage media, virtual storage media, cloud-based storage drives, storage servers, and/or the like. According to some embodiments, the local repository 130 may include logic that updates structured data stored within its storage devices based on updates to structured data stored within the data cloud server 105. In some cases, snapshots of structured data may be accessed using the secure computing environment 125 so that updates associated with the snapshots may be effected on the local repository 130.

As previously discussed, the network 110 facilitates communication between the data cloud server 105, the external source 112, and the secure computing environment 125. The network 110 may also allow different secure computing environments 125 to communicate with each other. According to one embodiment, the network 110 may include a plurality of networks. For instance, the network 110 may include any wired/wireless communication network that facilitates communication between the components of the network system 100. The network 110, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a fiber optics network, a laser-based network, and/or the like.

The secure computing environment 125 is configured to generate one or more user interfaces for accessing, analyzing, and displaying the structured data. According to some implementations, the secure computing environment 125 includes functionalities and/or enhanced security features that allow a user to securely access and/or securely manage structured data. As shown more clearly in the exemplary functional and system diagrams of FIGS. 2A and 2B, the secure computing environment 125 includes a processing system 202, a memory 204, and I/O system 206, and a communication system 208. The processing system 202, the memory 204, the I/O system 206, and the communication system 208 may include one or more subsystems that perform one or more of the operations described herein. Additionally, each system of the secure computing environment 125 may be operatively and/or otherwise communicatively coupled with each other so as to facilitate one or more operations described herein. The secure computing environment 125 may include general hardware, specifically-purposed hardware, and/or a combination thereof.

Figure 2A:
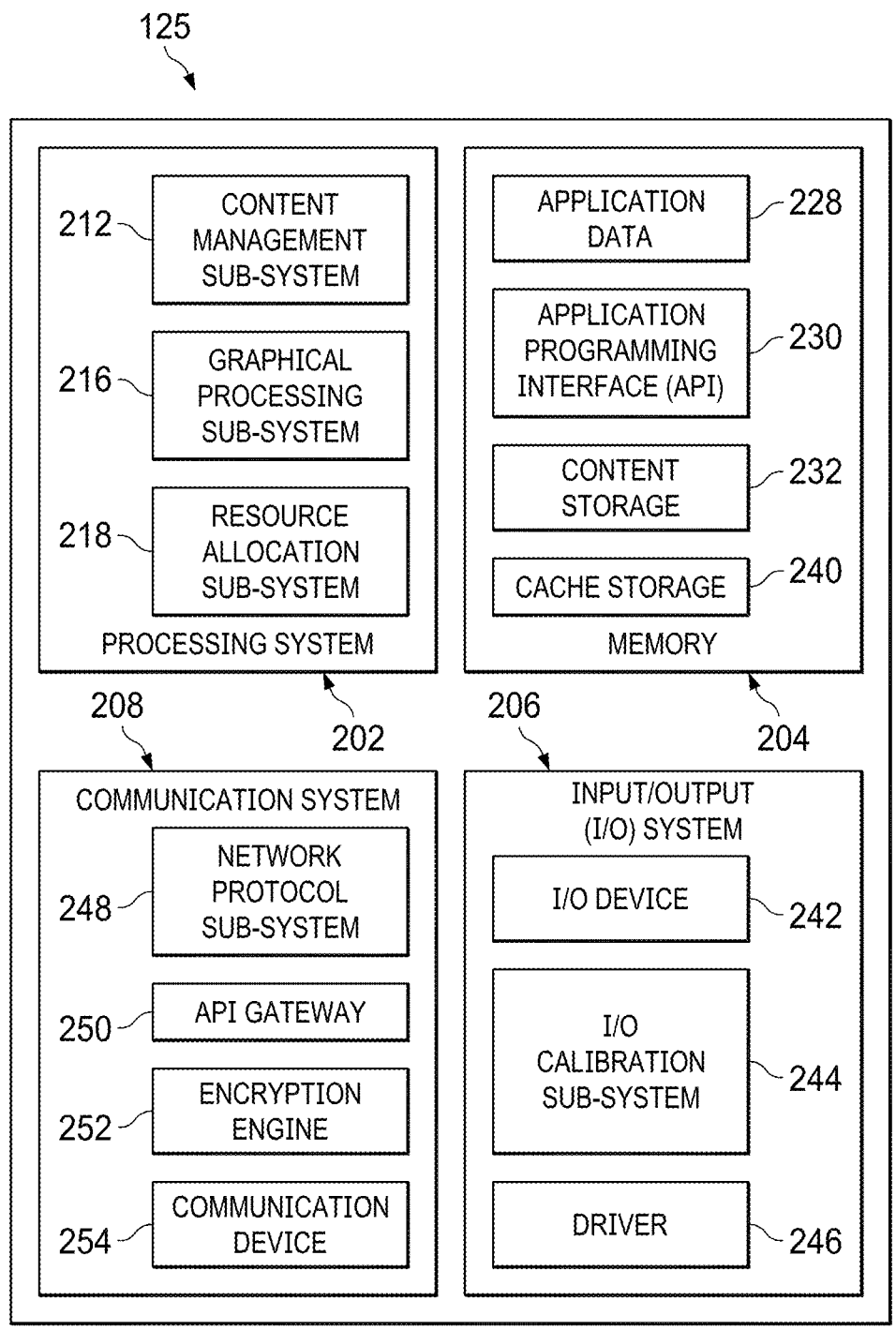
FIG. 2A is a functional block diagram of a computing environment for accessing and visualizing structured data, according to one embodiment.
Figure 2B:
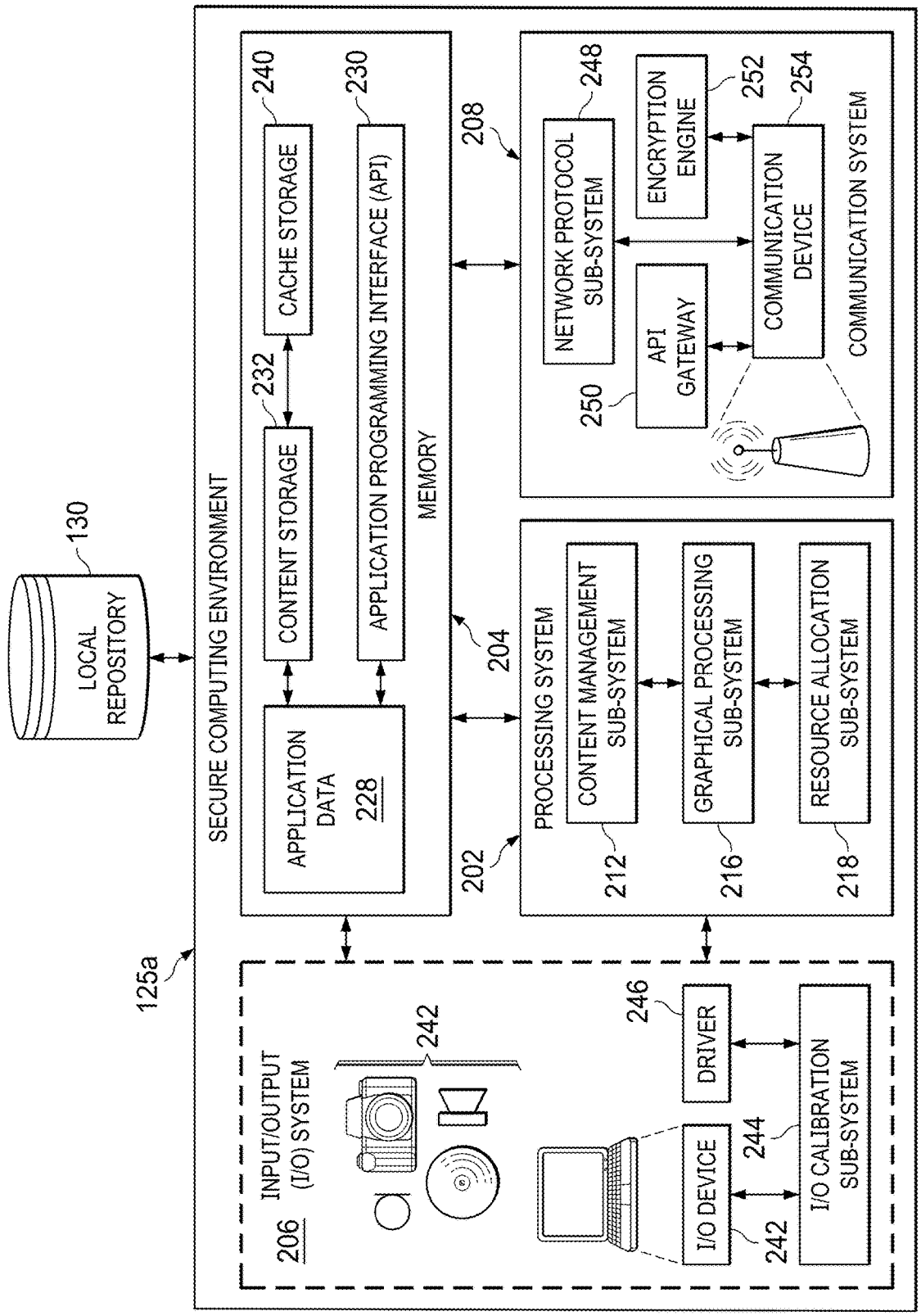
FIG. 2B is a detailed system diagram of FIG. 2A, according to one embodiment.

The processing system 202 may control the memory 204, the I/O system 206, and the communication system 208, as well as any included subsystems, elements, components, devices, and/or functions performed by the memory 204, I/O system 206, and the communication system 208. Additionally, any actions described in this disclosure as being performed by a processor or one or more processors of a computing device or one or more computing device processors and/or one or more computing system processors may be executed by the processing system 202 of FIGS. 2A and 2B. Further, while one processing system 202 is shown in FIGS. 2A and 2B, multiple processing systems may be present and/or otherwise included in the secure computing environment 125 or elsewhere in the overall network system 100 of FIG. 1. Thus, while instructions may be described as being executed by the processing system 202 (and/or various subsystems of the processing system 202), the instructions may be executed simultaneously, serially, and/or otherwise by one or multiple processing systems 202 on one or more computing devices.

According to one embodiment, the processing system 202 may be implemented as one or more computer processor chips and/or graphical processing unit (GPU) chips and may include a hardware device capable of executing computer instructions. The processing system 202 may execute instructions, codes, computer programs, and/or scripts. The instructions, codes, computer programs, and/or scripts may be received from the I/O system 206, the communication system 208, and/or stored in the memory 204, and/or received from the other subsystems of the secure computing environment 125 and/or received from other computing environments.

In some embodiments, the processing system 202 may include subsystems such as a content management subsystem 212, a graphical processing subsystem 216, and a resource allocation subsystem 218. Each of the aforementioned subsystems of the processing system 202 may be communicatively or operably coupled to each other.

The content management sub-system 212 may facilitate generation, modification, analysis, transmission, and/or presentation of content. Content may be file content, media content, structured data content, user interfaces, or any combination thereof. In some instances, content on which the content management system 212 operates includes structured data from the data cloud server 105, structured data from the local repository 130, user interface data, device information, images, text, themes, audio files, video files, documents, and/or the like. Additionally, the content management subsystem 212 may control the audio-visual environment and/or appearance of application data during execution of various processes. In some embodiments, the content management subsystem 212 may interface with a third-party content server and/or third-party memory locations for execution of its operations.

The graphical processing subsystem 216 may facilitate generation, modification, analysis, processing, transmission, and/or presentation of the content described above, as well as any data described herein. In some embodiments, the graphical processing subsystem 216 may be used to render content for presentation on a computing device (e.g., via a graphical user interface of the computing device). The graphical processing subsystem 216 may also include multiple graphical processing subsystems and therefore may be configured to perform and/or execute multiple processes in parallel. In some implementations, the graphical processing subsystem 216 may be used in conjunction with components of the memory 204, the I/O system 206, the communication system 208, and/or a combination thereof.

The resource allocation subsystem 218 may facilitate the determination, monitoring, analysis, and/or allocation of computing resources throughout the secure computing environment 125 and/or other computing environments. Computing resources of the secure computing environment 125 may be used by the processing system 202, the memory 204, the I/O system 206, and/or the communication system 208. These resources may include processing power, data storage space, network bandwidth, and/or the like. Accordingly, the resource allocation subsystem 218 may include sensors and/or other specially-purposed hardware for monitoring performance of each system and/or subsystem of the secure computing environment 125, as well as hardware for responding to the computing-resource needs of each system and/or subsystem. In some embodiments, the resource allocation subsystem 218 may use computing resources of a second secure computing environment separate and distinct from the secure computing environment 125 to facilitate a desired operation.

The memory 204 may be used for storing, recalling, receiving, transmitting, and/or accessing various files and/or data (e.g., structured data) during the operation of the secure computing environment 125. For example, the memory 204 may store, recall, and/or update structured data from the data cloud and/or the local repository as the case may be. In some embodiments, the memory 204 may store instructions and/or data that may be executed by the processing system 202. For instance, the memory 204 may store instructions that execute operations associated with one or more systems and/or one or more subsystems of the secure computing environment 125. For example, the memory 204 may store instructions for the processing system 202, the I/O system 206, the communication system 208, and for itself.

Memory 204 may include various types of data storage media such as solid state storage media, hard disk storage media, virtual storage media, and/or the like. Memory 204 may include dedicated hardware elements such as hard drives and/or servers, as well as software elements such as cloud-based storage drives. In some implementations, memory 204 may be a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing system 202. For example, the instructions stored may be a command, a current operating state of secure computing environment 125, an intended operating state of secure computing environment 125, and/or the like. As a further example, data stored in the memory 204 may include instructions related to various methods and/or functionalities described herein. The ROM device may be a non-volatile memory device that may have a smaller memory capacity than the memory capacity of a secondary storage of the secure computing environment. The ROM device may be used to store instructions and/or data that may be read during execution of computer instructions. In some embodiments, access to both the RAM device and ROM device may be faster to access than access to the secondary storage of the secure computing environment 125. Secondary storage may comprise one or more disk drives and/or tape drives which may be used for non-volatile/non-transitory storage of data or as an over-flow data storage device of the secure computing environment 125 if the RAM device is not large enough to hold all working data. Secondary storage may be used to store programs that may be loaded into the RAM device when such programs are selected for execution.

Turning back to FIG. 2A, the memory 204 may include subsystems such as application data 228, application programming interface 230, content storage 232, and cache storage 240. Application data 228 may facilitate deployment, storage, access, execution, and/or utilization of an application utilized by the secure computing environment 125 and/or any other computing environments described herein. As such, application data 228 may store any information and/or data associated with an application. Application data 228 may further store various pieces of information and/or data associated with the operation of an application and/or with the secure computing environment 125 as a whole, such as a status of computing resources (e.g., processing power, memory availability, resource utilization, and/or the like), runtime information, user interfaces, systems to direct execution of operations described herein to, user permissions, security credentials, and/or the like.

The application programming interface (API) 230 may facilitate deployment, storage, access, execution, and/or utilization of information associated with APIs of secure computing environment 125 and/or any other computing environment described herein. For example, secure computing environment 125 may include one or more APIs for various devices, applications, systems, subsystems, elements, and/or other computing environments to allow communication between one or more applications associated with the secure computing environment 125. Accordingly, API 230 may include API databases containing information that may be accessed and/or used by applications, systems, subsystems, elements, and/or operating systems of other devices and/or computing environments in communication with the secure computing environment 125. In some cases, the API 230 may enable the data cloud server 105 and the secure computing environment 125 to communicate with each other.

The content storage 232 may facilitate deployment, storage, access, and/or utilization of information associated with structured data as further discussed below. In one embodiment, content storage 232 may communicate with a content management system 212 to receive and/or transmit content (e.g., structured data, media content, etc.).

The I/O system 206 may include hardware and/or software elements for the secure computing environment 125 to receive, and/or transmit, and/or present information useful for generating one or more interfaces for retrieving and displaying structured data according to some embodiments of this disclosure. For example, elements of the I/O system 206 may be used to receive input from a user of the secure computing environment 125. As described herein, I/O system 206 may include subsystems such as I/O device 242, I/O calibration subsystem 244, and/or driver 246.

The I/O device 242 may facilitate the receipt, transmission, processing, presentation, display, input, and/or output of information as a result of executed processes described herein. In some embodiments, the I/O device 242 may include a plurality of I/O devices. In some embodiments, I/O device 242 may include a variety of elements that enable a user to interface with secure computing environment 125. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing system 202 and/or memory 204 to execute operations associated with generating user interfaces for retrieving and visualizing structured data.

The I/O calibration system 244 may facilitate the calibration of the I/O device 242. For example, I/O calibration system 244 may detect and/or determine one or more settings of I/O device 242, and then adjust and/or modify settings so that the I/O device 242 may operate more efficiently. In some embodiments, I/O calibration system 244 may use a driver 246 (or multiple drivers) to calibrate I/O device 242 as needed. For example, driver 246 may include software that is to be installed by I/O calibration system 244 so that an element of secure computing environment 125 (or an element of another computing environment) may recognize and/or integrate with I/O device 242.

The communication system 208 may facilitate establishment, maintenance, monitoring, and/or termination of communications between the secure computing environment 125 and other computing environments, third-party server systems, and/or the like. Communication system 208 may also facilitate internal communications between various elements (e.g., systems and/or subsystems) of secure computing environment 125. In some embodiments, communication system 208 may include a network protocol subsystem 248, an API gateway 250, an encryption engine 252, and/or a communication device 254. These systems and/or subsystems of the communication system 208 may be implemented as hardware, software, or a combination thereof.

The network protocol subsystem 248 may facilitate establishment, maintenance, and/or termination of a communication connection for the secure computing environment 125 via a network (e.g., network 110). For example, network protocol subsystem 248 may detect and/or define a communication protocol required by a particular network and/or network type. Communication protocols utilized by network protocol subsystem 248 may include Wi-Fi protocols, Li-Fi protocols, cellular data network protocols, Bluetooth® protocols, internet protocols, WiMAX protocols, Ethernet protocols, power line communication (PLC) protocols, and/or the like. In some embodiments, facilitation of communication for the secure computing environment 125 may include transforming and/or translating data from a first communication protocol to a second communication protocol. In some embodiments, network protocol subsystem 248 may determine and/or monitor an amount of data traffic to determine which network protocol is to be used for establishing a secure communication connection, transmitting data, and/or performing retrieval and subsequent visualization of structured data.

The application programming interface (API) gateway 250 may allow other devices and/or computing environments and/or applications external to the secure computing environment 125 to access the API 230 of the memory 204. For example, a computing system may access the API 230 of the secure computing environment 125 via the API gateway 250. In some embodiments, API gateway 250 may be required to validate user credentials associated with a user of a computing device (e.g., a device external to the secure computing environment 125) prior to providing access to the API 230 to the user. API gateway 250 may include instructions for the secure computing environment 125 and thereby communicate with external devices and/or between components of the secure computing environment 125.

The encryption engine 252 may facilitate translation, encryption, encoding, decryption, and/or decoding of information received, transmitted, and/or stored by the secure computing environment 125. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for secure computing environment 125 with external systems and/or devices. In some embodiments, communication device 254 may include one or more radio transceivers, chips, analog front end (AFE) units, antennas, processing units, memory, other logic, and/or other components to implement communication protocols (wired or wireless) and related functionality for facilitating communication for system 125. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

User Interfaces

In performing the operations shown in FIGS. 3-9, the example interfaces described herein may communicate with data cloud server 105 to access information either from the data cloud server 105 or the external source 112. The example interfaces described herein may be implemented on the secure computing environment 125 or alternatively on even a separate server/computer system coupled to network 110. Moreover, the example user interfaces described herein may utilize the communication resources of the secure computing environment 125 described herein to communicate with data cloud server 105. In addition, example user interfaces described in FIGS. 3-9 may utilize the communication resources of the separate server/computer system to communicate with data cloud server 105.

External source 112 may send a number of adverse event reports (AERs) to data cloud server 105 via network 110. The data cloud server 105 may use the AERs to devise new cases. The data cloud server 105 may evaluate which of the cases may require submissions and distribution to the different secure compute environments 125. In particular, the data cloud server 105 may include a number of rule sets defining the format of a submission as well as which of the secure compute environments 125 may receive the submission. Rule sets may be defined by a number of rules that are based on a number of parameters.

Once a new case is devised, it may be stored in the data cloud server 105 and versioned. In some instances, a follow up AER may be sent to the data cloud server 105 indicating certain information in a case has been changed. The data cloud server 105 may use an advanced algorithm that assesses the follow up AER and matches the information in the follow up AER to a case. This includes displaying how information in the follow up AER changes the previous case information. Moreover, the data cloud server 105 may allow the user to select which of these changes are eventually updated in the case. Once a change is done to the case, the version of the case is increased indicating an update has occurred.

Figure 3:
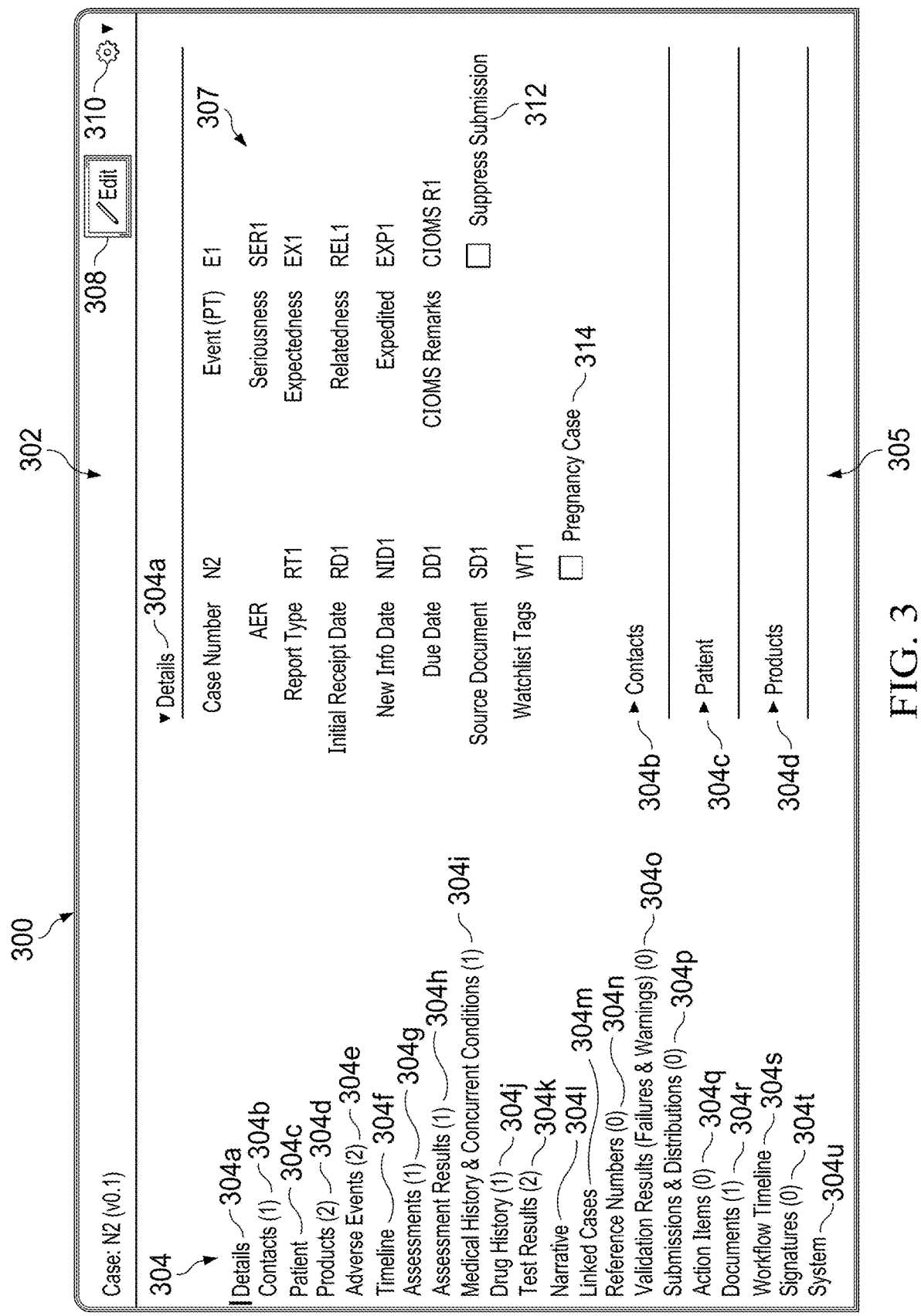
FIG. 3 shows an example interface 300 illustrating a detailed view of a case, according to one embodiment.

FIG. 3 shows an example interface 300 illustrating a detailed view of a case, according to one embodiment. The example interface 300 may provide the user more detailed information regarding the case N2 as produced by the data cloud server 105 using one or more adverse event reports. The example interface 300 may include listing portion 302 that shows detailed information of case N2. The example interface 300 may include a panel 304 having fields 304a-304u.

The region 305 of listing portion 302 may also include fields 304a-304u, but here the user may click a drop-down menu providing more detailed information for each field. Note for purposes of clarity only fields 304a-304d are shown, but all fields may be displayed by scrolling up or down. Also, when a user clicks one of the fields 304a-304u of panel 304, the user may be directed to the specific clicked field 304a-304u in region 305 to access the clicked field's detailed information.

Fields 304a-304u may include the following fields: Details 304a; Contact 304b; Patient 304c; Products 304d; Adverse Events 304e; Timeline 304f; Assessments 304g; Assessment Results 304h; Medical History and Concurrent Conditions 304i; Drug History 304j; Test Results 304k; Narrative 304l; Linked Cases 304m; Reference Numbers 304n; Validation Results 304o; Submissions and Distributions 304p; Action Items 304q; Documents 304r; Workflow Timelines 304s; Signatures 304t; and System 304u.

The region 307 of listing portion 302 may list the following content information fields for the Details field 304a: Case Number N2; Report Type RT1; Receipt Date RD1; New Info Date NID1; Due Date DD1; Source Document SD1; Watchlist Tags WT1; Event E1; Seriousness Ser1; Expectedness EX1; Relatedness REL1; Expedited EXP1; and CIOMS Remarks CIOM R1. The information fields of Details field 304a may include information provided by an adverse report. Note the information fields of the remaining fields 304b-304u may also include information provided by an adverse report. Moreover, region 307 may include suppression checkbox 312 and pregnancy case 314. When the suppression checkbox 312 may be checked, data cloud server 105 may suppress the information of Details field 304a for report generation. When the pregnancy case checkbox 314 may be checked, it is an indication case N2 may involve a pregnancy case.

The edit button 308 may allow a user to update information shown in listing portion 302 while button 310 may allow a user to preview various submission reports or update information needed for generating a submission.

Figure 4:
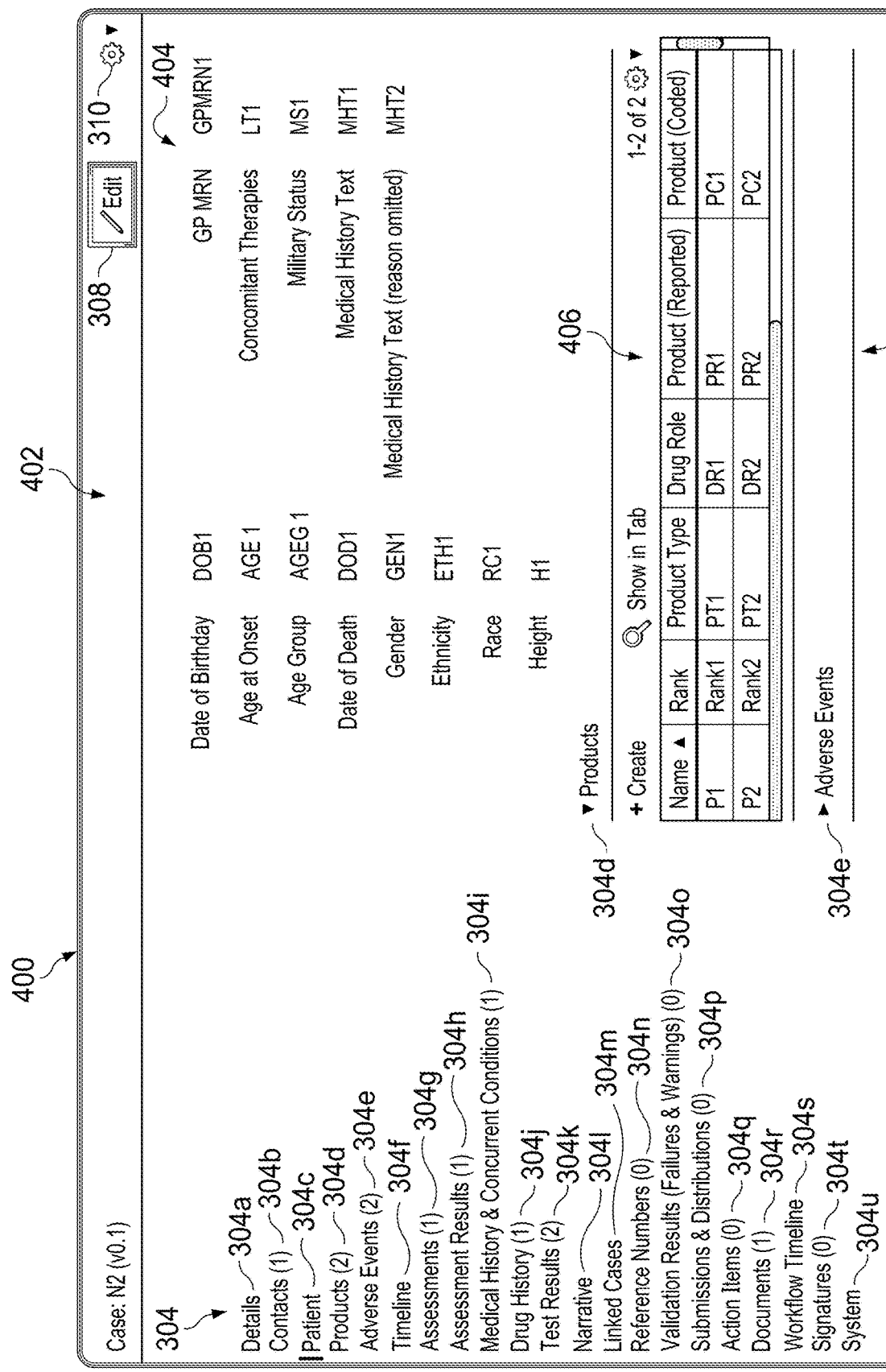
FIG. 4 shows an example interface 400 illustrating another detailed view of a case, according to one embodiment.

FIG. 4 shows an example interface 400 illustrating another detailed view of a case, according to one embodiment. Note example interface 400 is similar to example interface 300. The example interface 400 may provide more detailed information regarding patient field 304c and products field 304d of case N2 as produced by the data cloud server 105 using one or more adverse event reports. The example interface 400 may include listing portion 402 that shows detailed information of case N2. The example interface 400 may include a panel 304 having fields 304a-304u.

The region 405 of listing portion 402 may also include fields 304a-304u, but here the user may click a drop-down menu providing more detailed information for each field. Note for purposes of clarity only fields 304c-304e are shown, but all fields may be displayed by scrolling up or down. Also, when a user clicks one of the fields 304a-304u of panel 304, the user may be directed to the specific clicked field 304a-304u in region 405 to access the clicked field's detailed information.

The region 404 of listing portion 402 may list the following content information fields for the patient field 304c: Date of Birth DOB1; Age at Onset Age1; Age Group AgeG1; Date of Death DOD1; Gender Gend1; Ethnicity ETH1; Race RC1; Height H1; GP MRN GPMRN1; Concomitant Therapies CT1; Military Status MS1; and Medical History MHT2.

The information fields of patient field 304c may include information provided by an adverse report.

The region 406 of listing portion 402 may list in columns the following content information fields for the product field 304d: Name; Rank; Product Type; Drug Role; Product (Reported); and Product (Coded). In region 406, two products with product names P1 and P2 are provided. Product P1 further may include the following information fields: Rank Rank1; Product Type PT1; Drug Role DR1; Product (Reported) PR1; and Product (Coded) PC1. Product P2 further may include the following information fields: Rank Rank2; Product Type PT2; Drug Role DR2; Product (Reported) PR2; and Product (Coded) PC2. The information fields of patient field 304c may include information provided by an adverse report.

The information shown in region 406 may be hierarchically arranged so that when a user clicks on products P1 or P2, the user is directed to another set of detailed information regarding products P1 or P2 shown in a different example interface. This will be explained further below.

Note the information fields of the remaining fields 304e-304u may also include information provided by an adverse report.

Figure 5:
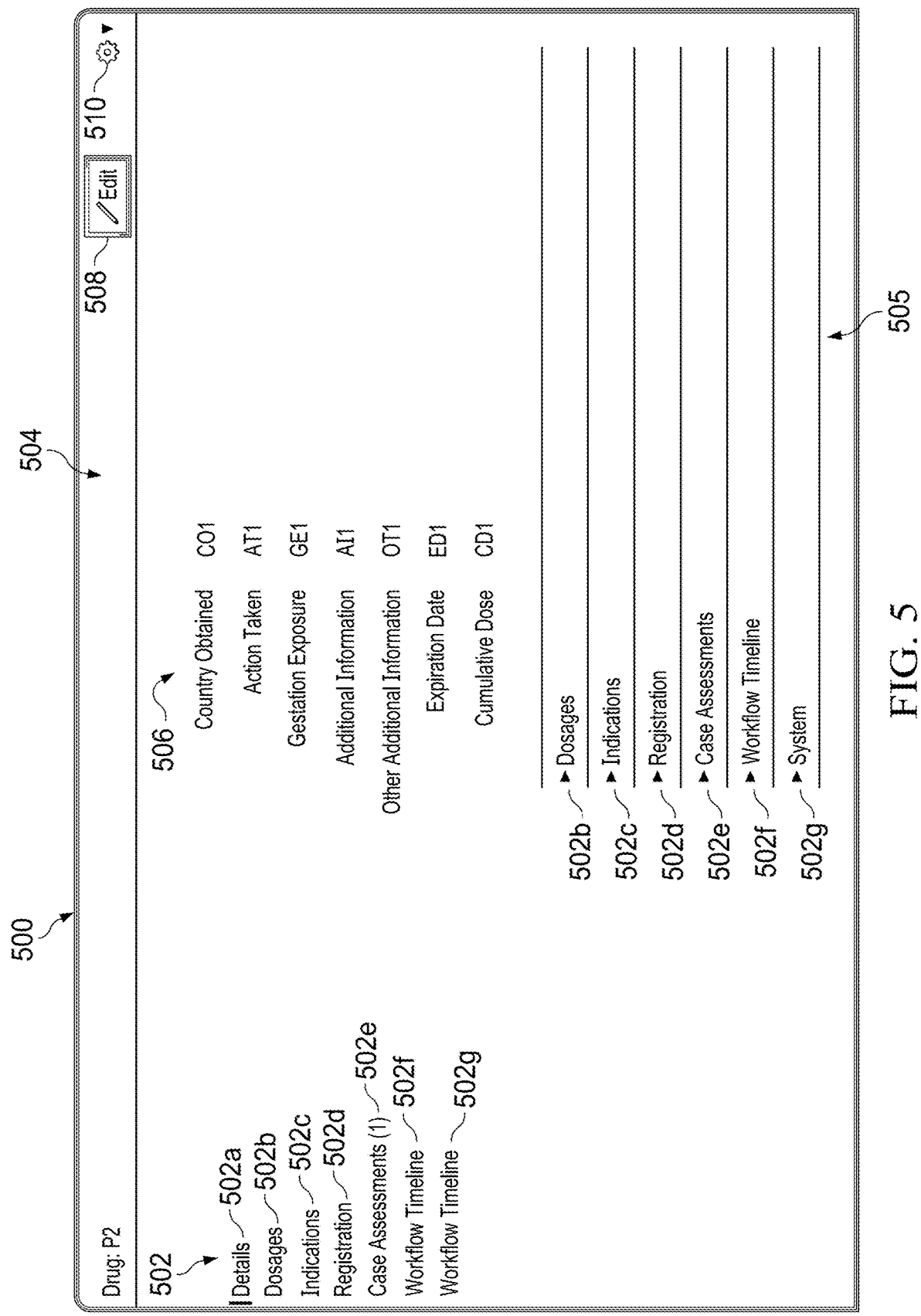
FIG. 5 shows an example interface illustrating a detailed view of a listed product field, according to one embodiment.

FIG. 5 shows an example interface 500 illustrating a detailed view of a listed product field 304d, according to one embodiment. The example interface 500 may include listing portion 504 that shows detailed information of product P2. A user may access example interface 500 by clicking on product P2 in example interface 400. Also, the example interface 500 may include a panel 502 having fields 502a-502g.

The region 505 of listing portion 504 may also include fields 502a-502g, but here the user may click a drop-down menu providing more detailed information for each field. Also, when a user clicks one of the fields 502a-502g of panel 502, the user may be directed to the specific clicked field 502a-502g in region 505 to access the clicked field's detailed information.

Fields 502a-502g may include the following fields: Details 502a; Contact 502b; Patient 502c; Products 502d; Adverse Events 502e; Timeline 502f; and Assessments 502g. In some embodiments, additional fields may be included.

The region 506 of listing portion 504 may list the following content information fields for the Details field 502a: Country Obtained CO1; Action Taken AT1; Gestation Exposure GE1; Additional Information AI1; Other Additional Information OT1; Expiration Date ED1; and Cumulative Dose CD1. The information fields of product P2 may include information provided by an adverse report.

Once a case has been processed and properly stored in data cloud server 105, updated information used in a case from the field may be provided via as a follow up adverse report. The data cloud server 105 may receive the follow up AER and utilize an algorithm to assess the follow up AER and properly identify the relevant case information to be updated. The disclosure describes example interfaces 600, 700, and 800 that demonstrate the ways in which one may compare updated information from a follow up adverse report or the like and decide whether such updated information may eventually be reproduced in the case information.

FIG. 6 shows an example interface 600 illustrating updated information for the details field, the contacts field, and the patients field of a case, according to one embodiment. The example interface 600 may include the same fields shown in example interfaces 300 and 400. In this case, the fields 304a, 304b, and 304c of example interfaces 300 and 400 are similar to fields 602a, 602b, and 602c of example interface 600. Moreover, listing 604a may list the content of the informational fields (Report Type, Receipt Date, New Info Date, Event, Seriousness, and Relatedness) of details field 602. While listing 604b may show whether or not informational fields (Report Type, Receipt Date, New Info Date, Event, Seriousness, and Relatedness) of the details field 602a have been updated.

In this case, two updates are shown as follows: (1) the New Info Date information field NID1 was newly added; and (2) the Seriousness informational field SER1 was modified/changed to SER2. Note for each updated informational field (New Info Date and Seriousness) a checkbox 610 may be provided. The user may accept the updated information for one or more of the updated informational fields (New Info Date and Seriousness) by leaving a checkmark in checkbox 612 associated with one or more of the updated informational fields. The user may reject the updated information for one or more of the updated informational fields (New Info Date and Seriousness) by leaving a blank in checkbox 612 associated with one or more of the updated informational fields. When this occurs, the updated informational field may not be reflected in listing 604b.

Listing 606a may list the content of the informational fields (Qualification, Title, First name, Last Name, Organization, Department, and Email) of contacts field 602b. While listing 604b may show whether or not informational fields (Report Type, Receipt Date, New Info Date, Event, Seriousness, and Relatedness) of contacts field 602b have been updated. Listing 606b shows the following updates: the First name informational field FN2 was rejected; the newly added Qualification informational field Q1 was accepted; the newly added Title informational field Ti was accepted; the modification of the Department informational field from D1 to D2 was accepted; the newly added Email informational field EM1 was accepted; and the Organization informational field O2 was rejected due to Organization informational field requiring this field not to be asked for privacy reasons or the like.

Once the user selects their preferred updated informational fields by clicking checkbox 612, the data cloud server 105 may update the previous case information using the user's chosen updated informational fields. Moreover, the data cloud server 105 may change the version of the corresponding case to reflect this change.

In some embodiments, information in an AER that was previously received and modified in a previous case version then received again by another follow up AER would not be automatically populated to the next case version. The algorithm determines whether not to overwrite previously modified information while still taking updates where they exist.

The algorithm may come across protected fields whose content is masked from view. The content of protected fields is masked to protect sensitive information, such as personal identification information or other private information. In these instances, the algorithm may update these protected fields where possible according to default rules.

Listing 608a may list the content of the informational fields (Patient First Name, Patient Last Name, Investigation MRN, Date of Birth, Gender, Height, and Weight) of contacts field 602b. While listing 604b may show whether or not informational fields (Report Type, Receipt Date, New Info Date, Event, Seriousness, and Relatedness) of patient field 602c have been updated. Listing 608b shows the following updates: the modification of the Patient First Name informational field from PFN1 to PFN2 was accepted; the newly added Patient Last Name informational field PLN1 was rejected; the newly added Investigation MRN informational field IMRN1 was accepted; the modification of the Date of Birth informational field from DOB1 to DOB2 was accepted; the newly added Height informational field H1 was rejected; the Weight informational field O2 was deleted; and newly added Gender informational field was updated even though the information was protected and not displayed for viewing.

The ignore button 610 and create button 614 may be used for repeating informational fields like those shown in listings 604a and 604b. When a user activates ignore button 610, all changes associated with the informational fields of listing 604a, as shown in listing 604b, may be ignored. A create button 614 may be used to create a new set of informational fields using the using information fields shown in listing 606b.

Figure 7:
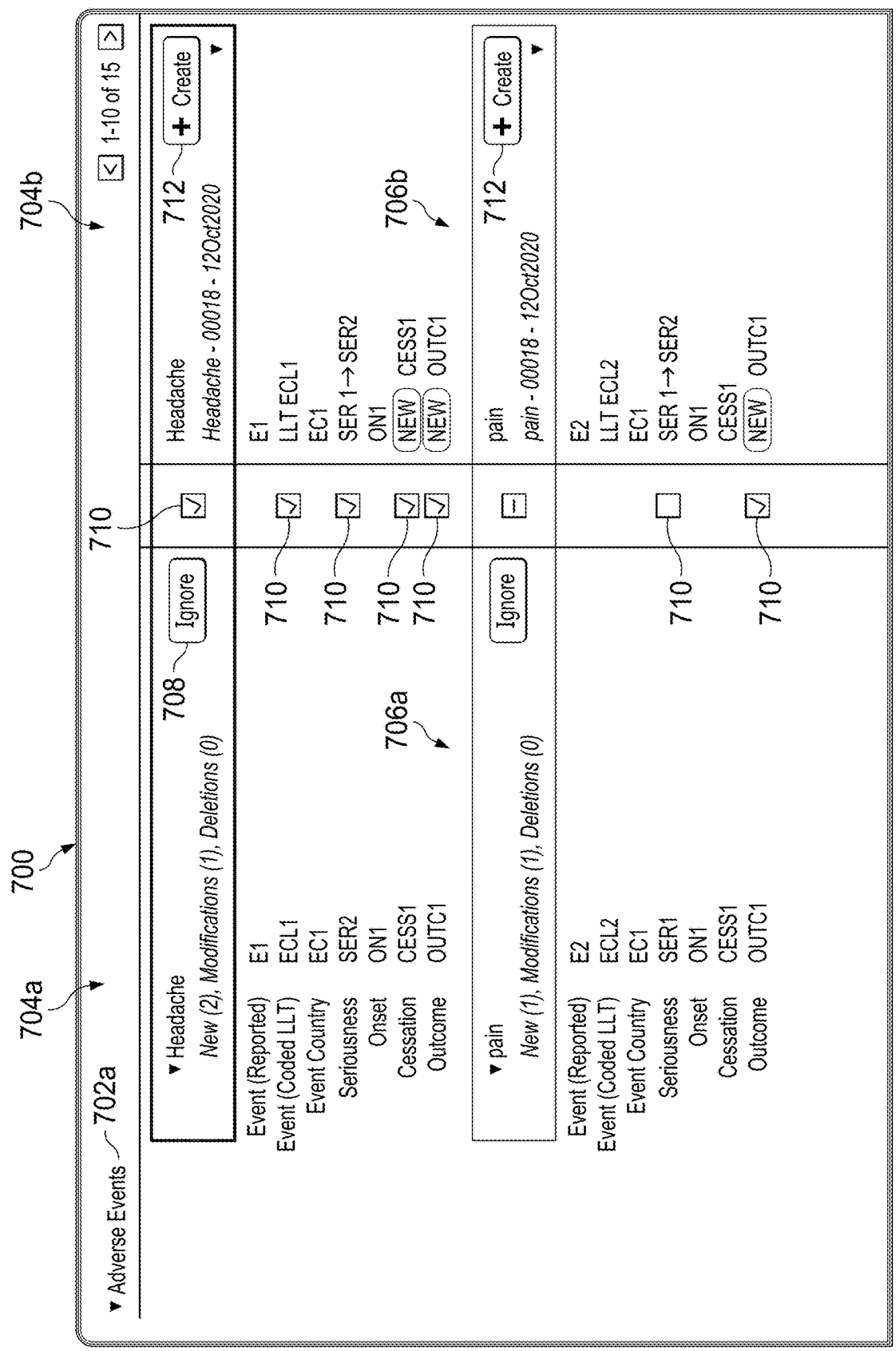
FIG. 7 shows an example interface 700 illustrating updated information for the Adverse Events field of a case, according to one embodiment.

FIG. 7 shows an example interface 700 illustrating updated information for the Adverse Events field of a case, according to one embodiment. The example interface 700 operates similarly as example interface 600. Moreover, the example interface 700 may include the same fields shown in example interfaces 300 and 400. In this case, the fields 304e of example interfaces 300 and 400 are similar to fields 702a of example interface 700. Note the Ignore button 708, checkbox 710, and Create button 712 operate similarly to the Ignore button 610, checkbox 612, and Create button 614 of example interface 600.

Listing 704a may list the content of the informational fields (Event (Reported), Event (Coded), Event Country, Seriousness, Onset, Cessation, Outcome) of Adverse Events field 702a. While listing 704b may show whether or not informational fields (Event (Reported), Event (Coded), Event Country, Seriousness, Onset, Cessation, Outcome) of Adverse Events field 702a have been updated. Listing 704b shows the following updates: the modification of the Seriousness informational field from SER1 to SER2 was accepted; the newly added Cessation informational field Cess1 was accepted; and the newly added Outcome informational field OUTC1 was accepted.

Listing 706a may list the content of the informational fields (Event (Reported), Event (Coded), Event Country, Seriousness, Onset, Cessation, Outcome) of Adverse Events field 702a. While listing 706b may show whether or not informational fields (Event (Reported), Event (Coded), Event Country, Seriousness, Onset, Cessation, Outcome) of Adverse Events field 702a have been updated. Listing 706b shows the following updates: the modification of the Serious informational field from SER1 to SER2 was rejected; and the newly added Outcome informational field OUTC1 was accepted.

Figure 8:
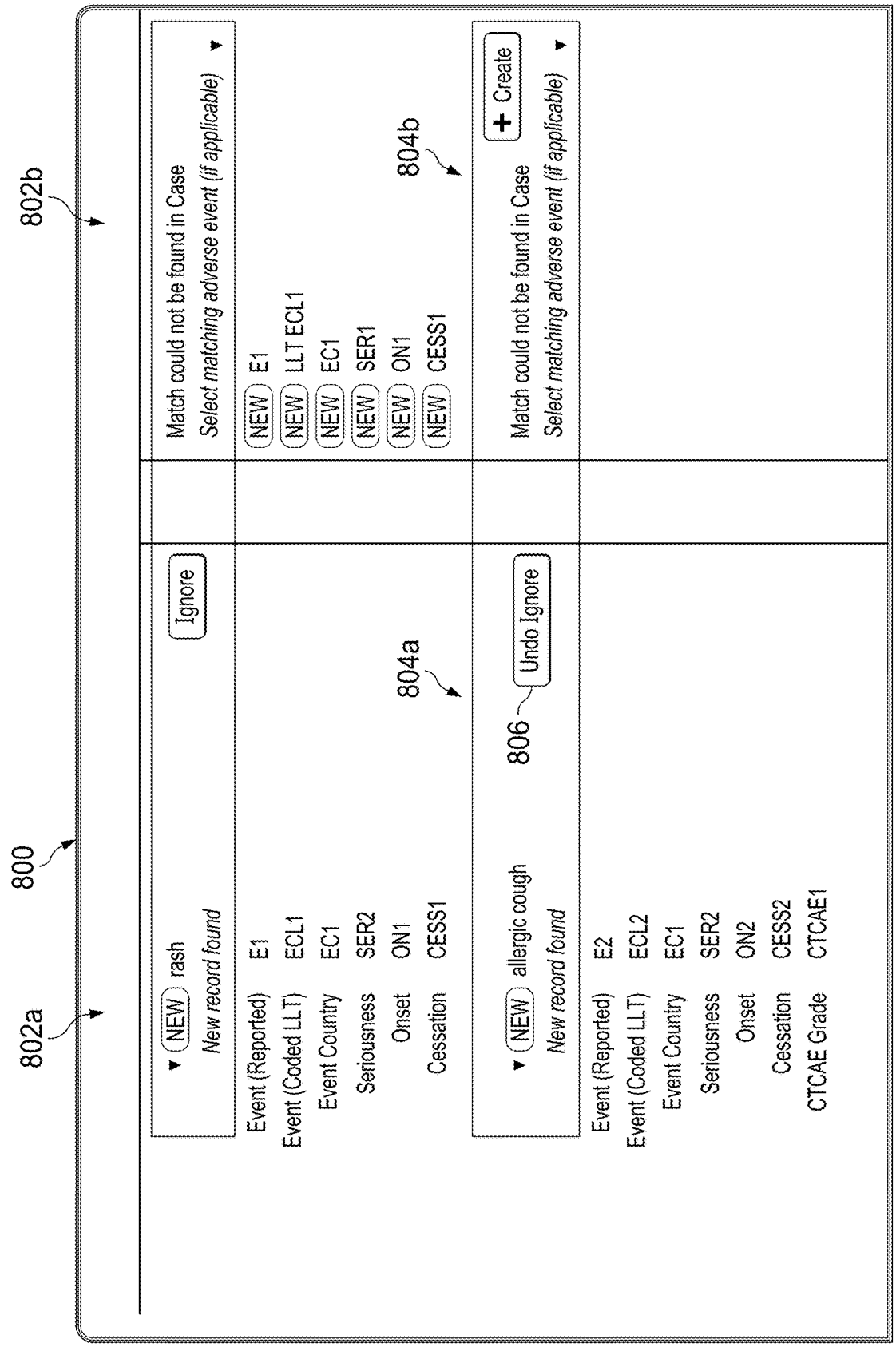
FIG. 8 shows an example interface illustrating updated information for two newly created adverse events for the Adverse Events field of a case, according to one embodiment.

FIG. 8 shows an example interface 800 illustrating updated information for two newly created adverse events with one being ignored for the Adverse Events field of a case, according to one embodiment. The example interface 800 operates similarly as example interface 700. Listing 802a may list the content of the informational fields (Event (Reported), Event (Coded), Event Country, Seriousness, Onset, Cessation) of Adverse Events field 702a associated with a rash. While listing 802b may show whether or not informational fields (Event (Reported), Event (Coded), Event Country, Seriousness, Onset, Cessation, Outcome) of Adverse Events field 702a have been updated. In this case, listing 802b shows all the informational fields (Event (Reported), Event (Coded), Event Country, Seriousness, Onset, Cessation,) were newly added and accepted.

Listing 804a may list the content of the informational fields (Event (Reported), Event (Coded), Event Country, Seriousness, Onset, Cessation) of Adverse Events field 702a associated with an allergic cough. While listing 804b may show whether or not informational fields (Event (Reported), Event (Coded), Event Country, Seriousness, Onset, Cessation, Outcome) of Adverse Events field 702a have been updated. However, listing 804b does not display any changes in the informational content fields of listing 804a, because all changes have been ignored due to the user activating the Ignore button 806.

Workflow

Figure 9:
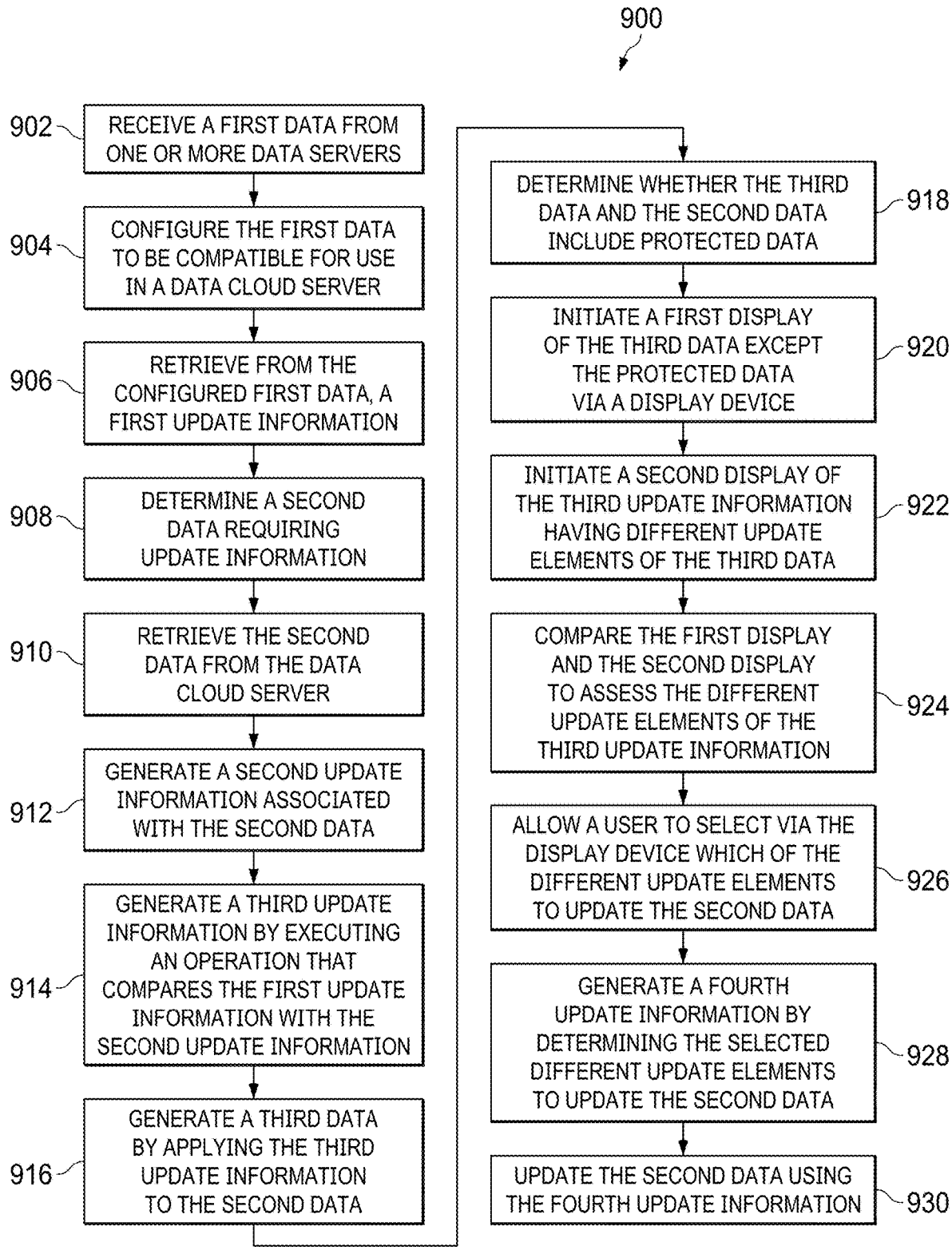
FIG. 9 show a flowchart illustrating method for submitting data in a computer network, according to one embodiment.

FIG. 9 show a flowchart 900 illustrating method for updating data in a computer network, according to one embodiment. In block 902, the method includes receiving, using one or more computing device processors, a first data from one or more data servers. At block 904, the method includes configuring, using the one or more computing device processors, the first data to be compatible for use in a data cloud server. At block 906, the method includes retrieving, using the one or more computing device processors, from the configured first data, a first update information. At block 908, the method includes determining, using the one or more computing device processors and the first update information, a second data requiring update information.

At block 910, the method includes, in response to determining the second data, retrieving, using the one or more computing device processors, the second data from the data cloud server. The method includes generating, using the one or more computing device processors and the second data, a second update information associated with the second data, as shown at block 912. Also, the method includes generating, using the one or more computing device processors, a third update information by executing an operation that compares the first update information with the second update information, wherein the third update information is associated with updating the second data, as shown at block 914. At block 916, the method includes generating, using the one or more computing device processors, a third data by applying the third update information to the second data.

At block 918, the method includes determining, using the one or more computing device processors, whether the third data and the second data include protected data. Moreover, the method includes initiating a first display, using the one or more computing device processors, of the third data except the protected data via a display device, as shown at block 920. Also, the method includes initiating a second display, using the one or more computing device processors, of the third update information having different update elements of the third data, wherein different graphical representations are used to indicate the different update elements via the display device, as shown at block 922. At block 924, the method includes comparing, using the one or more computing device processors, the first display and the second display to assess the different update elements of the third update information.

At block 926, the method includes allowing, using the one or more computing device processors, a user to select via the display device which of the different update elements to update the second data. The method includes generating, using the one or more computing device processors, a fourth update information by determining the selected different update elements to update the second data, as shown at block 928. Moreover, the method includes updating, using the one or more computing device processors, the second data using the fourth update information, as shown at block 930.

In some implementations, when receiving the first data, one or more data cloud server, such as data cloud server 105, may determine a format for the first data. In some implementations, the one or more data servers may arrange the first data to have one or more elements of the first update information.

In some implementations, the one or more data servers may determine whether the first data includes unstructured data. In some implementations, the one or more data servers may convert the first data into a format operational on a data cloud server.

In some implementations, the one or more data servers may analyze each element of the configured first data to determine elements of the first update information. In some implementations, the one or more data servers may determine a location for the second data in the one or more data cloud servers. In some implementations, the one or more data servers may determine which elements of the second data are updatable. In some implementations, the one or more data servers may determine whether an element of the first update information corresponds to a modification in an element of the second update information.

In some implementations, the one or more data servers may determining whether an element of the first update information corresponds to a newly formed element of the second update information. In some implementations, the one or more data servers may determine whether an element of the first update information corresponds to a deleted element of the second update information. In some implementations, the one or more data servers may provide user interface elements to select the different update elements. In some implementations, the one or more data servers may merge elements of the fourth update information to the second data.

In some implementations, a user interface may be provided for displaying details of the first data. In some implementations, a user interface may be provided for displaying details of the second data. In some implementations, a user interface may be provided for editing information of the first data. In some implementations, the user interface may be provided for allowing a user to view a new element of the third data. In some implementations, a user interface may be provided for displaying details of the fourth update information. In some instance, a user interface may be provided for displaying details of the updated second data.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment. In some embodiments, the terms "signal," "data," and/or "information" may be used interchangeably. In some embodiments, signals refer to non-transitory signals.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

The invention claimed is:

1. A method for updating data in a computer network, the method comprising:
    configuring, using one or more computing device processors, first data for use in or by a data cloud server;
    retrieving, using the one or more computing device processors, from the configured first data, a first update information;
    determining, using the one or more computing device processors and the first update information, a second data requiring update information;
    generating, using the one or more computing device processors and the second data, a second update information associated with the second data;
    generating, using the one or more computing device processors, a third update information based on executing an operation that compares the first update information with the second update information, wherein the third update information is associated with updating the second data;
    generating, using the one or more computing device processors, a third data based on applying the third update information to the second data, wherein the third update information comprises first update elements associated with the third data;
    determining, using the one or more computing device processors, whether the third data or the second data includes protected data;
    initiating a first display, via a display device, using the one or more computing device processors, of the third data, wherein the protected data is not displayed;
    determining, using the one or more computing device processors, second update elements based on one or more of the first update elements associated with the third data;
    generating, using the one or more computing device processors, a fourth update information based on the second update elements; and
    updating, using the one or more computing device processors, the second data using the fourth update information.

2. The method of claim 1, further comprising determining a format for the first data.

3. The method of claim 1, wherein configuring the first data comprises arranging the first data to have one or more elements of the first update information.

4. The method of claim 1, wherein configuring the first data comprises determining whether the first data includes unstructured data.

5. The method of claim 1, wherein configuring the first data comprises converting the first data into a format for use in or by the data cloud server.

6. The method of claim 1, wherein retrieving from the configured first data, the first update information, comprises analyzing a first element of the configured first data to determine a second element of the first update information.

7. The method of claim 1, further comprising comparing the third data and the third update information.

8. The method of claim 1, wherein generating the second update information comprises determining an updatable element of the second data.

9. The method of claim 1, wherein generating the third update information comprises determining whether a first element of the first update information corresponds to a modification in or to a second element of the second update information.

10. The method of claim 1, wherein generating the third update information comprises determining whether a first element of the first update information corresponds to a generated element of the second update information.

11. The method of claim 1, wherein generating the third update information comprises determining whether a first element of the first update information corresponds to a deleted element of the second update information.

12. The method of claim 1, further comprising initiating a second display, via the display device, using the one or more computing device processors, of the third update information.

13. The method of claim 1, wherein updating the second data comprises merging a first element of the fourth update information to the second data.

14. A system for updating data in a computer network, the system comprising
one or more computing device processors; and
one or more computing device memories, coupled to the one or more computing device processors, the one or more computing device memories storing instructions executed by the one or more computing device processors, wherein the instructions are configured to:
configure first data for use in or by a data cloud server;
retrieve from the configured first data, a first update information;
determine, using the first update information, a second data requiring update information;
generate, using the second data, a second update information associated with the second data;
generate a third update information based on executing an operation that compares the first update information with the second update information, wherein the third update information is associated with updating the second data;
generate a third data based on applying the third update information to the second data, wherein the third update information comprises first update elements associated with the third data;
determine whether the third data or the second data includes protected data;
initiate a first display of the third data, wherein the protected data is not displayed;
determine second update elements based on one or more of the first update elements associated with the third data;
generate a fourth update information based on the second update elements; and
update the second data using the fourth update information.

15. The system of claim 14, wherein the instructions are further configured to provide a user interface for displaying the first data.

16. The system of claim 14, wherein the instructions are further configured to provide a user interface for displaying the second data.

17. The system of claim 14, wherein the instructions are further configured to compare the third data and the third update information.

18. The system of claim 14, wherein the instructions are further configured to provide a user interface for displaying the fourth update information.

19. The system of claim 14, wherein the instructions are further configured to provide a user interface for displaying the updated second data.

20. A method for updating data in a computer network, the method comprising:
retrieving, using one or more computing device processors, from a first data, a first update information;
determining, using the one or more computing device processors and the first update information, a second data for which the first update information is used to update at least one element of the second data;
generating, using the one or more computing device processors and the second data, a second update information associated with the second data;
generating, using the one or more computing device processors, a third update information based on executing an operation that compares the first update information and the second update information, wherein the third update information is associated with updating the second data;
generating, using the one or more computing device processors, a third data based on applying the third update information to the second data, wherein the third update information comprises first update elements associated with the third data;
determining, using the one or more computing device processors, whether the third data or the second data includes protected data;
initiating a first display, via a display device, using the one or more computing device processors, of the third data, wherein the protected data is not displayed;
determining, using the one or more computing device processors, second update elements based on one or more of the first update elements associated with the third data;
generating, using the one or more computing device processors, a fourth update information based on the second update elements; and
updating, using the one or more computing device processors, the second data using the fourth update information.

* * * * *